D. McDONALD.
PROCESS OF REGENERATING IRON OXID USED IN GAS PURIFICATION.
APPLICATION FILED OCT. 12, 1911.
1,061,859.
Patented May 13, 1913.
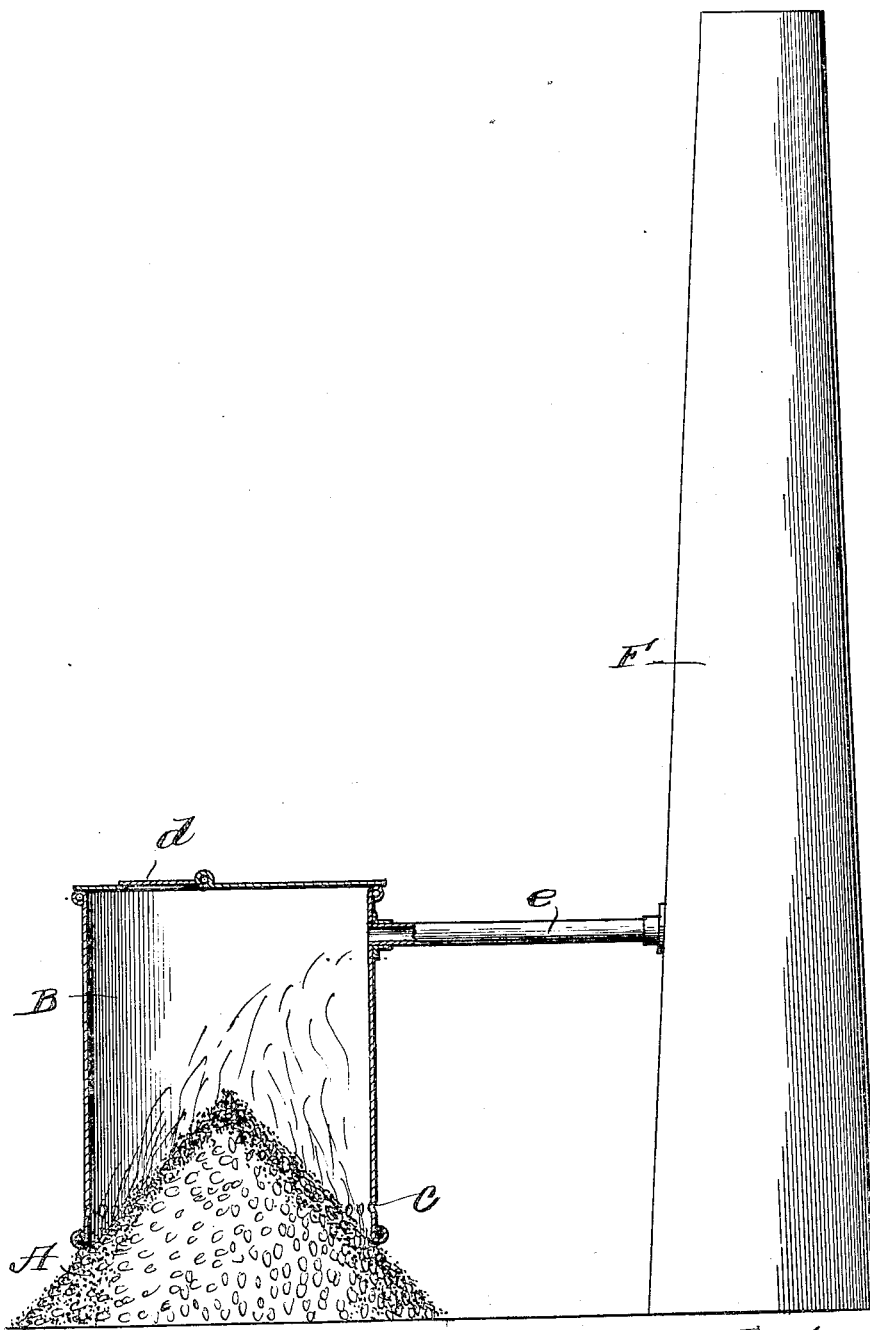

UNITED STATES PATENT OFFICE.

DONALD McDONALD, OF LOUISVILLE, KENTUCKY.

PROCESS OF REGENERATING IRON OXID USED IN GAS PURIFICATION.

1,061,859. Specification of Letters Patent. Patented May 13, 1913.

Application filed October 12, 1911. Serial No. 654,425.

*To all whom it may concern:*

Be it known that I, DONALD McDONALD, a citizen of the United States, residing at Louisville, in the county of Jefferson and State of Kentucky, (whose post-office address is corner Seventh and Ormsby streets, in said city of Louisville,) have invented certain new and useful Improvements in Processes of Regenerating Iron Oxid used in Gas Purification, of which the following is a specification.

In the manufacture of commercial gas, the gas, after being treated in the tar separator, scrubber and so forth, is led to a purifier for the purpose of removing its contained sulfur compounds. In this purifier, iron oxid is used, which, after a period of use, becomes "spent", in that its sulfur absorbing capacity becomes exhausted, in which condition it will contain about 50%, by weight, of sulfur impurity, the reaction being about as follows:—

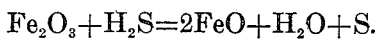

$$Fe_2O_3 + H_2S = 2FeO + H_2O + S.$$

It has been proposed to regenerate this spent iron oxid generally after leaching it to recover ammoniacal and cyanid salts, by roasting in kilns, and producing, on the one hand, sulfurous acid which may be collected in water to produce sulfuric acid, and on the other hand restoring the iron oxid to a form in which it can be used anew in purification of gas.

The restricted quantity of spent oxid produced in city gas plants does not usually justify installation of acid chambers and other facilities for producing sulfuric acid. Nor will municipal regulations permit of setting free the sulfurous fumes in quantities and under conditions incident to the regeneration of the oxid in roasting ovens; and if the oxid be burned in a hot fire above red heat, the black oxid results instead of the red oxid, and it is rendered useless for purifying purposes. Consequently, it has heretofore been customary to market the spent oxid to other establishments, where it can be collected in sufficient quantities to regenerate it with recovery of by-products, and remarket the oxid. The economic conditions of this practice, due mainly to double transportation, are such as to afford a very low price for the spent gas-house oxid. On the other hand, the intrinsic value of the sulfur content in the spent oxid is relatively small compared with the value of the oxid, if cost of shipment can be avoided by regeneration on the gas-house premises and the loss may even be reduced to *nil*, if the use of special fuel can be avoided. Again, the expense of transportation can be avoided if the process can be carried on within the municipality without commitment of nuisance.

My present invention attains the several ends desired, in a simple manner which is economical even without saving the impurities as by-products, and, therefore, solves the problem stated.

My invention consists primarily in firing a body of spent oxid under conditions which retard combustion, and result in restoring the red oxid desired, while delivering the sulfurous acid fumes only in such gradual quantities that when set free in the atmosphere they will be so far diluted by the atmosphere as to be unobjectionable, particularly if delivered through a relatively high stack that will afford opportunity for considerable distribution before they reach the lower levels. The invention further consists in firing the impure oxid by means of its combustible impurities as fuel; also in carrying on the operation by supplying air in a manner to cause combustion upon the surface only, of a relatively large pile of the oxid, so that not only is combustion slow but the heat is accumulated and drives off the volatile impurities from within, to continue burning on the surface; the regenerated oxid as fast as it is converted from ferrous to ferric form, being caused by its finely reduced physical form, to feed down the outer surface of the pile to the base where it can be collected, and at the same time exposing fresh material for regeneration.

A form of apparatus suitable in principle for carrying out my invention is illustrated in the accompanying drawing, showing the apparatus in elevation and partial section and wherein A represents a pile of oxid to be regenerated; B, a hood or combustion chamber covering said pile and standing in such relation thereto as to exclude air, except such as enters in selectively regulated quantities through openings $c$; said hood having a feed door $d$ through which to maintain the supply of oxid to be treated, and a flue $e$, leading to a stack F, through which the fumes may be discharged at a relatively great height.

If desired, and if the quantity of material treated should justify it, acid collecting chambers could be introduced between the combustion chamber and the stack.

I claim:—

1. The process of regenerating iron oxid which has become spent by use in the purification of gas, said process consisting in igniting the combustible contents of a body of the spent oxid and setting free the sulfur to be eliminated in the form of vapor.

2. The process of regenerating iron oxid which has become spent by use in the purification of gas and of making harmless the obnoxious gases of combustion resulting therefrom, said process consisting in igniting the combustible contents of a body of the spent oxid under conditions which retard combustion and slowly set free the sulfur and other contents to be eliminated in the form of vapor; the material to be treated being collected in a pile in a combustion chamber and fired upon the outer surface permitting the ash or regenerated oxid to flow down from the firing area for removal and at the same time exposing fresh oxid to be fired.

The foregoing specification signed at Louisville, Ky., this 20th day of September, 1911.

DONALD McDONALD.

In presence of—
F. S. McDONALD,
WM. H. CRUTCHER.